United States Patent
Aissi (10) Patent No.: US 9,654,977 B2
(45) Date of Patent: May 16, 2017

(54) CONTEXTUALIZED ACCESS CONTROL

(71) Applicant: Visa International Service Association, San Francisco, CA (US)

(72) Inventor: Selim Aissi, Menlo Park, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 709 days.

(21) Appl. No.: 14/082,727

(22) Filed: Nov. 18, 2013

(65) Prior Publication Data

US 2014/0143149 A1    May 22, 2014

Related U.S. Application Data (60) Provisional application No. 61/727,526, filed on Nov. 16, 2012.

(51) Int. Cl.
| | |
|---|---|
| H04W 12/08 | (2009.01) |
| G06F 21/31 | (2013.01) |
| G06F 21/62 | (2013.01) |
| G06Q 20/32 | (2012.01) |
| H04W 88/02 | (2009.01) |

(52) U.S. Cl.
CPC ............ *H04W 12/08* (2013.01); *G06F 21/31* (2013.01); *G06F 21/316* (2013.01); *G06F 21/629* (2013.01); *G06F 2221/2113* (2013.01); *G06Q 20/322* (2013.01); *H04W 88/02* (2013.01)

(58) Field of Classification Search
CPC ............... G06F 21/31; G06F 21/629; G06F 2221/2113; G06F 21/316; G06Q 20/322; H04W 88/02; H04W 12/08
See application file for complete search history.

(56) References Cited

U.S. PATENT DOCUMENTS

| | | | |
|---|---|---|---|
| 8,171,298 B2 | 5/2012 | Ramaswamy et al. | |
| 2008/0172715 A1* | 7/2008 | Geiger | G06F 21/32 726/1 |
| 2010/0317371 A1 | 12/2010 | Westerinen et al. | |
| 2011/0010761 A1* | 1/2011 | Doyle | G06F 21/6218 726/5 |
| 2012/0271913 A1 | 10/2012 | Tallgren et al. | |
| 2013/0104187 A1 | 4/2013 | Weidner et al. | |
| 2013/0252597 A1 | 9/2013 | Jin et al. | |

FOREIGN PATENT DOCUMENTS

| | | |
|---|---|---|
| WO | WO/2010/133770 A1 | 11/2010 |
| WO | WO/2012/073250 A1 | 6/2012 |
| WO | WO/2013/024278 A1 | 2/2013 |
| WO | WO/2013/024279 A1 | 2/2013 |
| WO | WO/2013/1207023 A1 | 8/2013 |

* cited by examiner

*Primary Examiner* — Jung Kim
*Assistant Examiner* — Tri Tran
(74) *Attorney, Agent, or Firm* — Kilpatrick Townsend & Stockton LLP (57) ABSTRACT

Contextual information associated with a mobile device can be automatically acquired using various sensors on the device. Based on the contextual information and an access control policy associated with an application on the mobile device, a level of access to the application can be determined. An entity may be identified, authenticated and authorized to gain full access, varying degree of restricted access or no access to the application based on the access control policy. Different applications may be provided different levels of access based on the access control policy associated with each application.

20 Claims, 8 Drawing Sheets

Access Control Policies 214                                              300

| Application | Full Access<br>High level | Restricted Access<br>Medium level | Restricted Access<br>Low level |
|---|---|---|---|
| Payment<br>Banking<br>Virtual Wallet<br>Stocks<br>302 | Threshold Range: 90-100<br><br>- Make Payments<br>- Money Transfer<br>- Withdrawal<br>- Buy or Sell stocks | Threshold Range: 70-90<br><br><br>- View balance<br>- View stock portfolio | Threshold Range: 50-70<br><br><br><br>- Deposits |
| Email<br>Texting<br>Social Networking<br>Video-Telephony<br>Blogs<br>Phone<br>Contacts<br>304 | Threshold Range: 80-100<br><br>- Post Comments<br>- Send email, text<br>- make phone calls<br>- Update Contacts | Threshold Range: 60-80<br><br>- Read emails, texts, posts<br>- View Contacts | Threshold Range: 40-60<br><br>- Read blogs<br>- Receive Phone calls |
| Video Games<br>Web Search<br>Music<br>E-Books<br>Photos<br>306 | Threshold Range: 70-100<br><br>- Edit Play list for music<br>- Online access<br>- Update Photos | Threshold Range: 50-70<br><br>- Play music<br>- No online access<br>- E-Books read only<br>- Photos view only | Threshold Range: 30-50<br><br>- Play music<br>- No online access<br>- E-Books read only |
| Maps<br>Calculator<br>Weather<br>Notepad<br>308 | Threshold Range: 60-100<br><br><br>Full access | Threshold Range: 10-60<br><br><br>No access | |

CONTEXTUALIZED ACCESS CONTROL

CROSS-REFERENCES TO RELATED APPLICATIONS

This application is a non-provisional application and claims the benefit of priority of U.S. Provisional Application No. 61/727,526 titled "Contextualized Access Control" and filed on Nov. 16, 2012, which is herein incorporated by reference in its entirety for all purposes.

BACKGROUND

Embodiments of the invention are directed to systems and methods for mobile device security.

Mobile device security plays an important role. However, different authentication checks to allow access to various resources on the mobile device may cause unnecessary burden on the user and in some cases loss of time. For example, the user may have to enter a password or provide a biometric proof just to unlock the screen on the mobile device, after the mobile device has been inactive for a period of time. The user may be in a hurry or may enter the wrong password or the PIN which may take even longer to access the mobile device, thus frustrating the user.

Embodiments of the invention address this and other problems, individually and collectively.

BRIEF SUMMARY

Embodiments of the invention provide a context aware solution for mobile device security by using contextual information from the physical environment surrounding the mobile device. Contextual information associated with the mobile device can be automatically acquired using various sensors on the device. Based on the contextual information and an access control policy associated with an application on the mobile device, a level of access to the application can be determined. For example, a user associated with the mobile device may be permitted full access, varying degree of restricted access or no access to the application based on the acquired contextual information and the access control policy associated with the application. Different applications may be provided different levels of access based on the access control policy associated with each application.

One embodiment of the invention relates to a method comprising automatically receiving, at a mobile device, contextual information associated with the mobile device. The method further comprises accessing, at the mobile device, an access control policy associated with an application and determining, at the mobile device, a level of access for the application based on the contextual information associated with the mobile device and the access control policy associated with the application. The method further comprises providing, by the mobile device, access to the application based on the determined level of access.

Another embodiment of the invention is directed to a mobile device comprising a processor, and a computer readable medium coupled to the processor. The computer readable medium comprises code, executable by the processor, to automatically receive contextual information associated with the mobile device and access an access control policy associated with an application. The process is further configured to determine a level of access for the application based on the contextual information associated with the mobile device and the access control policy associated with the application, and provide access to the application based on the determined level of access.

These and other embodiments of the invention are described in further detail below.

DETAILED DESCRIPTION

Generally, a user of the mobile device has to go though few steps of authentication checks every time the user wants to access the mobile device or an application on the mobile device. For example, the user may have to enter a password or provide a biometric proof just to unlock the screen on the mobile device, after the mobile device has been inactive for a period of time. In some cases, the user may have to enter a password or another identification to access an application on the device even if the mobile device is on, for example, posting a comment on a social networking website or conducting a money transfer using a payment account. This may cause unnecessary burden on the user and in some cases loss of time. The user may be in a hurry or may enter the wrong password or the PIN which may take even longer to access the application, thus frustrating the user.

Embodiments of the invention provide a context aware solution for mobile device security by using contextual information from the physical environment surrounding a user and the mobile device. Various sensors (e.g., optical, audio, motion, location, touch, etc.) may be used to obtain contextual information through awareness of the surrounding environment associated with the mobile device and its user at any given point in time.

Embodiments of the invention provide a system and method to automatically obtain contextual information associated with a mobile device to allow modulated access to various applications associated with the mobile device. A level of access to an application may be determined based on the contextual information and an access control policy associated with the application. For example, an entity may be identified, authenticated and authorized to gain full access, varying degree of restricted access or no access to the application based on the access control policy. The access control policy may include different thresholds that authorize different levels of access for various applications. For example, using sensors on the mobile device, a location, time, picture, voice, fingerprints, gestures, etc. associated with a user may be automatically acquired and compared with the values stored in the user's profile to identify and authenticate the user. Furthermore, the user (or entity) may be authorized a level of access to use an application on the mobile device based on the policy. Additionally, in some implementations, the contextual information may be compared against behavioral patterns associated with the user to identify and authenticate the user. These behavioral patterns associated with the user may be determined locally at the mobile device or received from a remote service.

As an example, before authorizing a user of a mobile device access to her email during her train ride to work, the mobile device may determine that it is traversing through a familiar route (e.g. using a location and motion sensor), it may sense the user's touch and/or gestures (e.g., using a touch screen and camera) and it may sense user's surroundings in the train (e.g., using an audio sensor) and allow the access to the email without requiring the user to enter a password or another identifier. Furthermore, the level of access to the email may be modulated depending on the contextual information acquired by the sensors. For example, the user may be authorized write and read access to the email, just read access or no access to the email based on an access control policy associated with the email application. However, during the same period that the email is being accessed by the user, the same contextual information may be sufficient to authorize the user full access to another application, e.g., editing the play list of a music player application. In some embodiments, the level of access may be modulated by dynamically updating contextual information at any time, including while the user is accessing the application via the mobile device.

By automatically detecting the context based on the environmental inputs surrounding a mobile device and its user at a given point in time and providing the user with the appropriate access with respect to the application, embodiments of the invention provide the benefit of sparing the user additional effort and unwanted behavior in certain situations, while adhering to the mobile security protocols.

Prior to discussing embodiments of the invention, description of some terms may be helpful in understanding embodiments of the invention.

"Contextual information" may include information associated with a context at any given point in time. In some embodiments, the context may refer to a situation and/or an environment surrounding a user of a mobile device. As the context changes due to change in the environment surrounding the user, the mobile device may be able to detect the change in the context. The contextual information may include one or more of a location, time, picture, voice, touch or gestures associated with the user. In some embodiments, a context associated with the user of the mobile device may be determined using various sensors on the device.

"Automatically receiving" may refer to receiving information without explicitly requiring the user to provide input or interact with the device. The mobile device may automatically acquire contextual information using various sensors associated with the mobile device. The contextual information may be acquired before or during the request to access an application. In some embodiments, the contextual information is accumulated over a period of time.

An "application" may be a software application configured to run on a mobile device. Applications may be associated with payment, banking, phone, video-telephony, music players, utility functions (e.g., calendar, notepad, calculator, etc.), games, social networking websites, email, texting, maps, stocks, camera, e-books, blogs, weather, etc. In some embodiments, a user interface (e.g., graphical or audio) may be associated with an application to facilitate interaction with the user. In some embodiments, the application may provide access to a remote account or service, such as a payment account for making online payments. For example, a user can run an application, provide inputs, change the contents or view the contents associated with the application using the user interface. In some embodiments, contents of an application may be used/ updated by another application.

"Access" to an application on a mobile device may include allowing a user or another entity (e.g., another application) associated with the mobile device to be able to use one or more functions associated with the application or read and/or modify contents associated with the application for the mobile device. In one embodiment of the invention, using an application may include executing an application, accessing contents of the application, or using a graphical user interface on the device associated with a particular application by a user.

"Access control" may imply selective restriction of access to the applications associated with a mobile device. In one embodiment, access to an application may be restricted at least based on the contextual information associated with the mobile device at a given point in time.

An "access control policy" may include policy or rules to provide access controls to an application associated with a mobile device. For example, an entity such as a user or a first application may request access to a second application or contents of the second application associated with the mobile device. In one embodiment of the invention, the access control policy may include policy or rules for identification, authentication and authorization of the entity to provide the entity a level of access to an application. In one embodiment, the access control policy may include a plurality of threshold ranges associated with different levels of access to an application. A threshold range may include an upper and lower bound of a range. For example, an upper threshold range to provide a high level of access may be 100 and a lower threshold range may be 90 . Similarly, a second range for a medium level restricted access may be 70 to 90, a third range for a low level restricted access may be 50-70 and a fourth range for no access may be 0-50 . In one embodiment, different levels of access may be associated with different authorization levels specified by the policy. For example, a first authorization level may allow creating new data, a second authorization level may allow modifying the existing data and a third authorization level may only allow reading the existing data. In some cases, a fourth authorization level may allow removal of the data or may be a combination of few levels. In another embodiment, the access control policy may include a threshold or threshold range associated with each type of contextual information. For example, the access control policy may include a first threshold for a location, a second threshold for voice, and a third threshold for a behavioral pattern (e.g., time of day the application is accessed). A comparison of the contextual information against the one or more thresholds dictated by the access control policy may be used in determining the level of access to the application. In some implementations, the access control policy for an application may be determined by a remote server, the provider of the application, the mobile device, the user or any combination thereof. In one embodiment, the access control policy may be determined and managed by a remote trusted entity (e.g., a financial institution) that would ensure integrity and authenticity of the policy associated with a secure application (e.g. payment or financial application).

A "level of access" to an application may refer to type of access permitted to an application associated with a mobile device. In one embodiment, a high level of access to an application may imply that the user has been authorized complete access to the application. Some non-limiting examples of high level of access may include conducting a financial transaction, posting a comment on a website, updating contact information, updating personal information, etc. In one embodiment, a low level of access to an application may imply that the user has been authorized restricted access to the application or may be allowed only certain actions. Some non-limiting examples of low level of access may include viewing or reading the contents associated with the application (e.g., viewing the account balance, emails, website posts, etc.), playing music, games, accessing the notepad, calendar, etc., but not updating the contents. In one embodiment, a level of access may also include no access to an application. In some embodiments of the invention, a level of access may imply different actions for different applications that may be authorized based on the access control policy. For example, a low level of access for a social networking application may allow reading the posts, whereas, a low level of access for a music player application may only allow listening to music but not editing the playlist.

A "mobile device" may comprise any electronic device that may be operated by a user, which may also provide remote communication capabilities to a network. The mobile device may be configured to enable a user download an application from a server (e.g., web server) via a communication network (e.g., the Internet). The mobile device may further be configured to execute one or more applications. Some non-limiting examples of mobile devices include mobile phones (e.g. cellular phones), PDAs, tablets, net books, laptops, personal music players, hand-held specialized readers, game consoles, etc.

A "user" may be an entity, such as, an individual that may be associated with one or more personal accounts and/or mobile devices. The user may be able to access an application on the mobile device, run the application, make changes to the contents or view the contents of the application using a user interface.

A "server computer" may typically be a powerful computer or cluster of computers. For example, the server computer can be a large mainframe, a minicomputer cluster, or a group of servers functioning as a unit. The server computer may be associated with an entity such as a payment processing network or a financial institution.

Figure 1:
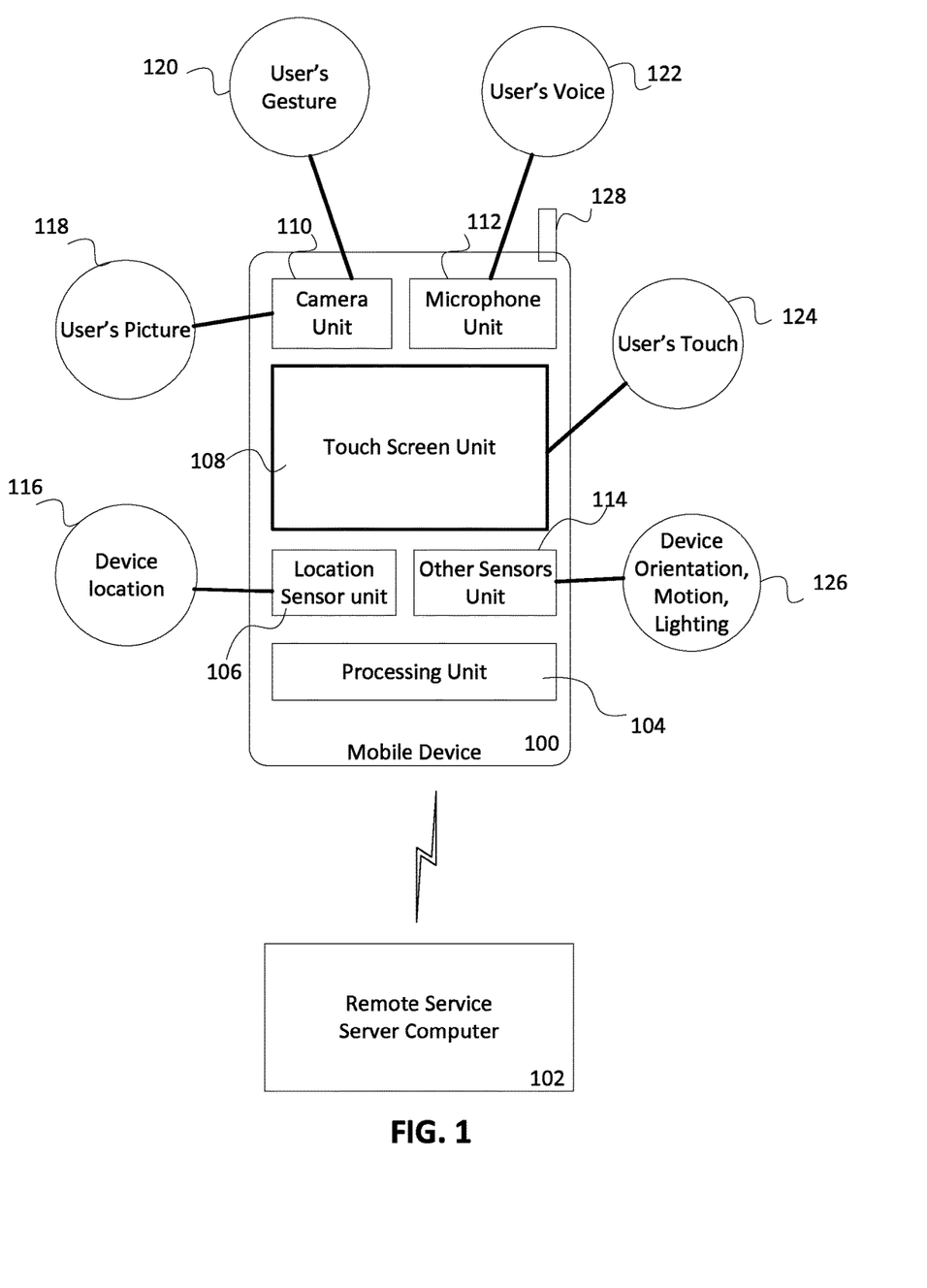
FIG. 1 illustrates a mobile device with at least some of the elements for generating contextualized access control, in one embodiment of the invention.

FIG. 1 illustrates a mobile device with at least some of the elements for generating contextualized access control, in accordance with an aspect of the invention.

A mobile device 100 may be configured to acquire environmental input associated with the mobile device 100 using various sensors as shown in the figure. In one embodiment, the mobile device 100 may be configured to communicate with a remote service server computer 102 via a wired or wireless communication network (not shown) such as the Internet or any other suitable network or combination of networks. The remote service server computer 102 may be associated with a remote trusted entity such as a payment processing network, a mobile network operator, an issuer, an application provider or any such entity configured to communicate with the mobile device 100. It will be understood that the mobile device 100 may be configured to communicate with one or more such entities in some embodiments of the invention.

The mobile device 100 may include a processing unit 104, a location sensor unit 106, a touch screen unit 108, a camera unit 110, a microphone unit 112, and other sensors unit 114. It will be understood that the mobile device 100 may include other components, which are not shown in FIG. 1, to perform the intended functions of a mobile device.

The location sensor unit 106 may be configured to determine a device location 116 using one or more known methods to provide location information for the mobile device 100. For example, the location of the mobile device 100 may be determined using a Global Positioning System (GPS), network based positioning (e.g., using an antenna 128 coupled to the mobile device 100) or a hybrid positioning system. In one embodiment, a network based positioning system may utilize a service provider's network infrastructure to identify the location of the mobile device 100. In some embodiments, the location information may include actual coordinates of the mobile device 100 (e.g., latitude, longitude and/or altitude). In one embodiment, a GPS receiver may be built into the mobile device 100 to track the mobile device 100. Some other non-limiting examples to determine the device location 116 may include handset based, SIM-based or WiFi based device tracking.

In some embodiments, behavioral patterns associated with the user may be employed in determining the level of access to a mobile device or applications associated with the mobile device. For example, a frequently visited location by a user of the mobile device 100 (e.g., home, office, car) may be marked as a safe location so that access to the mobile device 100 or any application on the mobile device 100, in or around the same location may be allowed with minimal or no authentication. For different users of the mobile device 100, different locations may be marked safe in their respective profiles. In one embodiment, user's profiles may be stored in a memory that may be part of the processing unit 104. In some embodiments, if the location of the user hasn't changed significantly over a predetermined period of time, and the user was successfully authenticated in previous attempts at the same location or relatively close to that location within the predetermined period of time then minimal or no authentication may be required for the user to access an application on the mobile device 100.

The touch screen unit 108 may be configured as a display and may utilize one or more touch sensors based on a suitable touchscreen technology to sense a user's touch 124, such as one or more bare fingers. The user can use the touch screen unit 108 to interact with the display (e.g., using a virtual keyboard or by selecting or controlling what is displayed). Some embodiments of the invention may use sensors to identify how a user holds the device in her hands, in a pocket or a bag and the related information may be stored in her default profile to provide access control. Some non-limiting examples of the touchscreen technology may include capacitive, resistive, acoustic pulse recognition or optical based approach for sensing touch of a user. The display may allow a user to view text messages, phone numbers, images, and other information. In some embodiments, a graphical user interface may be provided on the display for the user to view a profile and update certain parts of the profile. In some embodiments, each application on the mobile device 100 may provide its own graphical user interface for the user to interact with the application.

The mobile device 100 may also utilize a camera unit 110 to take a user's picture 118 (and/or video) and/or a user's gesture 120. A gesture may be an action performed by the user by moving parts of her body, for example, face or hands, in combination with voice or without voice. As an example, a user may use a tap or a knock, a whistling sound, an okay sign, a high five sign, a signature movement or similar gestures for identification. The captured image or set of images may be provided to the processing unit 104 for further analysis. In some embodiments, the one or more users of the device may have their pictures and/or gestures recorded for creating a default profile that can be accessed to validate if the user is an authorized user of the device. For example, the processing unit 104 can utilize any suitable image recognition algorithm to match the user's image or signature movements stored in a default profile of the user.

The mobile device 100 may utilize a microphone (MIC) unit 112 to collect audio data from user's voice 122 and the surroundings that can be processed to identify the user. For example, the microphone unit 112 may be configured to convert audio signals into electrical signals that may be provided to the processing unit 104. The processing unit 104 may utilize any suitable voice or speech recognition algorithm to match the user's voice with the voice stored in a default profile of the user. In one embodiment, the microphone unit 112 may be used in combination with the camera unit 110 to identify the user's gesture 120 and to validate the user. In some embodiments, one or more users of the mobile device 100 may record their voice for creating a profile associated with the user to validate each user associated with the mobile device 100.

Note that FIG. 1 illustrates only few sensors for sensing environmental inputs associated with a user of the mobile device 100, however, other suitable sensors (such as an accelerometer, a gyroscope, a motion sensor, an optical sensor, etc.) may be used for collecting additional environmental inputs for generating contextual information associated with the mobile device 100. For illustrative purposes, such other sensors are shown as the other sensors unit 114 in FIG. 1.

The mobile device 100 may also include other components such as a keyboard and/or a mouse to allow a user to input information into the mobile device 100, and a speaker to allow the user hear voice communication, music, etc.

The processing unit 104 may be configured to receive contextual information generated by various sensor units such as the location sensor unit 106, the touch screen unit 108, the camera unit 110, the microphone unit 112 and the other sensors unit 114, process the contextual information and provide access to one or more applications associated with the mobile device 100. The processing unit 104 is further described in detail with reference to FIG. 2.

Figure 2:
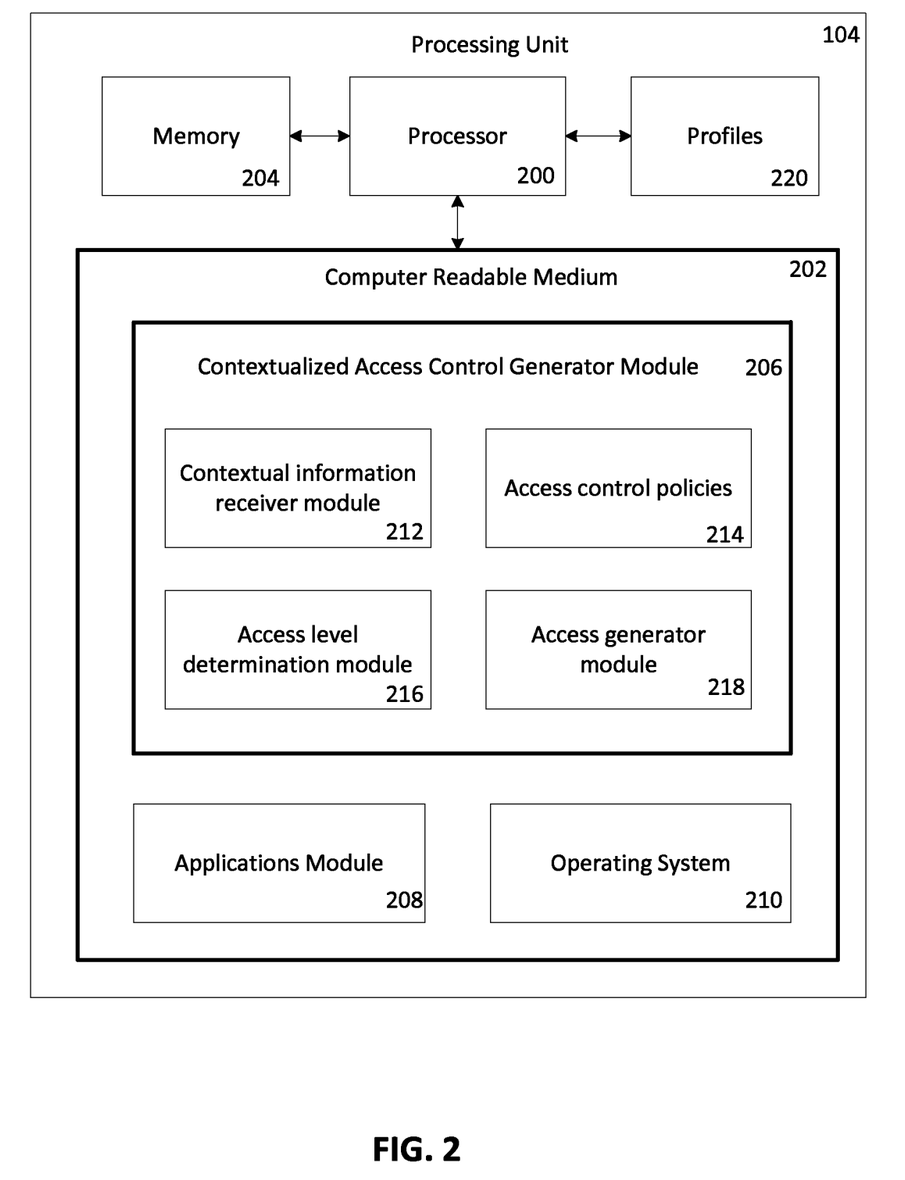
FIG. 2 illustrates at least some of the elements of a processing unit in one embodiment of the invention.

FIG. 2 illustrates at least some of the elements of the processing unit 104 in accordance with an aspect of the invention.

In one embodiment, the processing unit 104 may include a processor 200 that may be communicatively coupled to a computer readable medium (CRM) 202, a memory 204 and profiles 220.

The memory 204 may be internal to the mobile device 100 or hosted remotely (i.e., cloud) and accessed wirelessly by the mobile device 100. In some embodiments, the memory 204 may be configured as a volatile run-time memory and/or a cache. Volatile memory is memory that requires power to maintain the stored information (e.g., SRAM, DRAM, etc.).

The CRM 202 may comprise code executable by the processor 200 for implementing methods using embodiments of the invention. The CRM 202 may be in the form of a memory that stores data and could be internal to the mobile device 100 or hosted remotely (i.e., cloud) and accessed wirelessly by the mobile device 100. In some embodiments, the CRM 202 may include non-volatile, non-writable storage area (e.g., Flash ROM) where the firmware/operating system may reside. Non-volatile memory is memory that can retain the stored information even when not powered. Examples of non-volatile memory include read-only memory (see ROM), flash memory, most types of magnetic computer storage devices (e.g. hard disks, floppy discs and magnetic tape), optical discs, etc.

Profiles 220 may be configured to store profiles of one or more users of the mobile device 100. In one embodiment, a profile associated with a user may include information associated with the user that may be used to compare with the contextualized information automatically acquired by the mobile device 100 to identify and authenticate the user and determine a level of access that may be authorized to an application based on an access control policy associated with the application. In one embodiment, a profile associated with a user in the profiles 220 may include one or more pictures, behavioral patterns, voice, fingerprints, gestures or signature movements of the user. For example, the user may store her default profile using various sensors on the mobile device 100. In some embodiments, the profiles 220 may be part of the CRM 202, stored on a secured element (not shown) coupled to the processor 200 or stored on a remote server. In one embodiment, a user may choose which contextual information in her profile may be used to provide access controls for an application. For example, a user may choose location as a primary context for validation, whereas, another user may choose picture as the primary context. In one embodiment, different context options may be prioritized for each user.

The CRM 202 may include a contextualized access control generator module 206, an applications module 208 and an operating system 210.

The applications module 208 may include a plurality of applications associated with the mobile device 100. The plurality of applications may be associated with but not limited to payment, banking, virtual wallet, games, email, social networking, blogs, web search engines, e-books, music players, texting, weather, maps, stocks, calendar, calculator, notepad, etc. In some embodiments, an entity may be authorized a certain level of access to an application based on an access control policy associated with the application. For example, the access control policy may specify if an application may be installed, un-installed or contents of the application may be updated or used for different levels of access that can be authorized.

A payment application may allow a user of the mobile device 100 to conduct a transaction using a payment account number associated with the user. For example, the payment account number may be stored in a secure element or in a database (e.g. cloud storage) associated with a remote server. Similarly, a banking application may allow the user to conduct money transfer, deposits or allow cash withdrawals using a bank account associated with a financial institution. In some embodiments, the payment and/or the banking application may be associated with a virtual wallet application on the mobile device 100. In some embodiments, financial applications (e.g., payment, banking, etc.) and/or the virtual wallet application may be stored in a secure element for secure execution of the applications. In one embodiment, a first entity, such as a user or another application, may be authorized to only read the payment account number, whereas a second entity may be authorized to remove or update the account number based on the access control policy.

The operating system 210 may be a collection of software that can manage computer hardware resources and can provide common services for applications. The operating system 210 may be configured to enable the installation and execution of applications on the mobile device 100.

The contextualized access control generator module 206 may include a contextual information receiver module 212, access control policies 214, an access level determination module 216, and an access generator module 218.

The contextual information receiver module 212 may be configured to automatically receive contextual information associated with the mobile device 100. In some embodiments, the contextual information may be acquired using one or more of the sensor units as discussed with reference to FIG. 1. For example, the contextual information receiver module 212 may receive information associated with one or more of the device location 116, user's picture 118, user's gesture 120, user's voice 122, user's touch 124 and some other contextual information such as the orientation, motion, time or lighting associated with the mobile device 100.

In one embodiment, a contextual value or score may be generated from the contextual information received by the contextual information receiver module 212. For example, on a scale of 1 to 100, a contextual value of 95 may indicate a high assurance level associated with the acquired contextual information, whereas, a contextual value of 30 may indicate a low assurance level associated with the acquired contextual information. In some embodiments, there may be one contextual value associated with one type of sensor. For example, in some cases, a good quality picture of the user may be acquired resulting in a high contextual value (e.g., 80) for the user's picture 118, whereas, a poor quality voice sample may be acquired resulting in a low contextual value (e.g., 40) for the user's voice 122. In some embodiments, different weightage may be given to different contextual information captured from different sources in order to generate a normalized contextual value associated with context from various sources.

The access control policies 214 may include access control policies associated with various applications. The access control policies 214 may include a plurality of threshold ranges or characteristics associated with different levels of access to an application on the mobile device 100. In one embodiment, the access control policies 214 may include rules for identification, authentication and authorization of an entity to provide the entity different levels of access to an application. For example, based on the policy, a user trying to access her email may be identified and authenticated using the acquired context information and the profiles 220. The policy may dictate that the user may be authorized to only read the email but not authorized to share the email. In some embodiments of the invention, the access control policies 214 may be determined and managed by a remote trusted entity (e.g., associated with the remote service server computer 102 in FIG. 1). In one embodiment of the invention, some parts of the policy may be modified by a user of the mobile device 100. The access control policies 214 may be different for different users based on their profile. For example, the policy may authorize a user access to a payment application but may not authorize his children any access to the application. Further, the user's spouse may be authorized a different level of access to the payment application than the user. An example of the access control policies 214 is illustrated in a table 300 with reference to FIG. 3.

Figure 3:
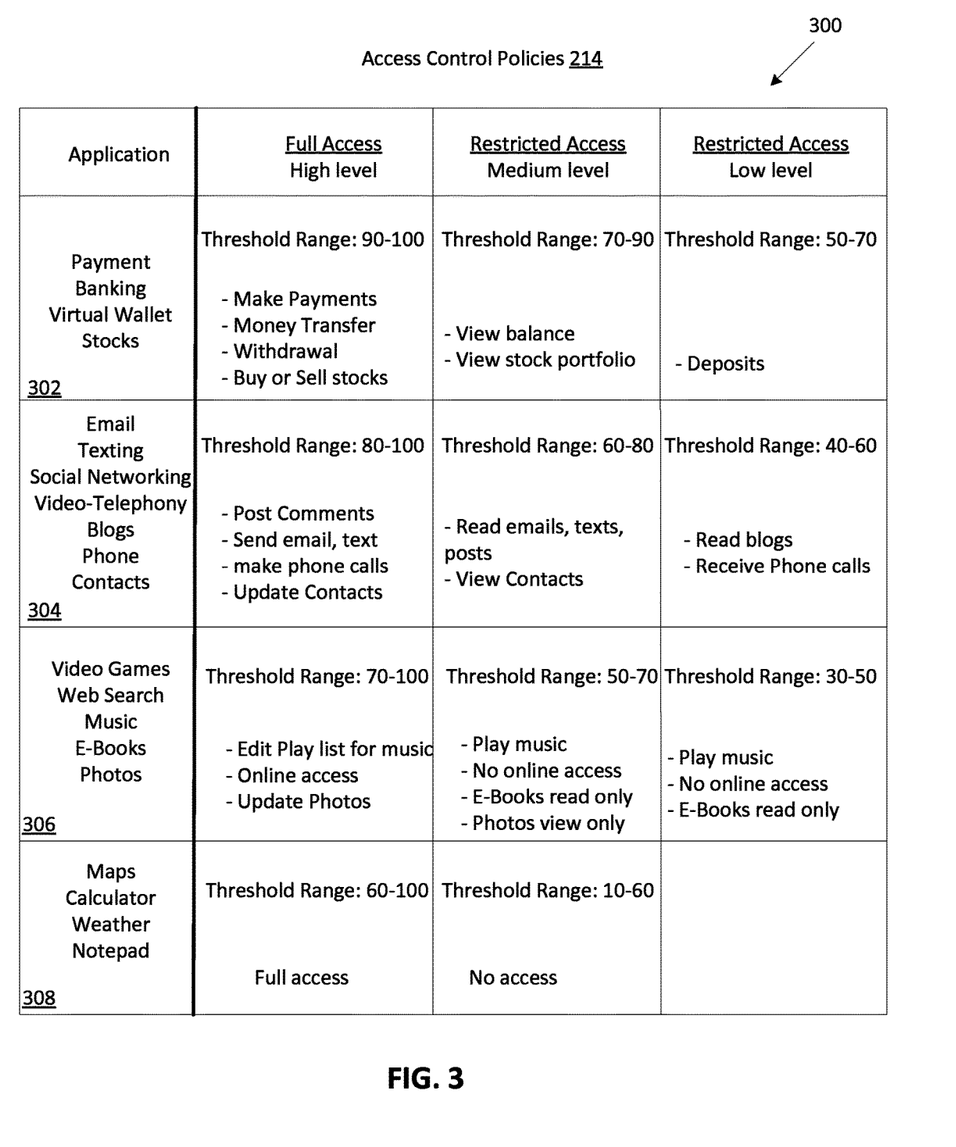
FIG. 3 illustrates a table for access control policies associated with applications in one embodiment of the invention.

As illustrated in FIG. 3, different threshold ranges may be associated with different applications to determine the level of access for each application. In some embodiments, the threshold ranges may be associated with different authorization levels. For example, for a set of applications 302 (e.g., applications associated with payment, banking, virtual wallet, stocks, etc.), full access to an application may be authorized if the contextual information acquired by the mobile device 100 is within a threshold range, as specified by the access control policy. In one embodiment, a contextual value generated by the contextual information receiving module 212 based on the acquired contextual information may be compared with a pre-determined corresponding threshold range and accordingly a level of access to the application may be authorized. For example, a user may be authorized to initiate a payment transaction using a payment application or perform money transfer using a banking application if the contextual value is determined to be 95, as shown in FIG. 3. On the other hand, if the contextual value is 80, a medium level restricted access to the application may be authorized. For example, for financial applications, only viewing of the account balance may be allowed. In some embodiments, viewing of balance of only certain accounts may be authorized based on the profile. Similarly, for stock applications, buying and selling of the stocks may be allowed for a contextual value of 92, whereas, only viewing of the stock portfolio may be authorized for a contextual value of 78. As illustrated in the table 300, for a contextual value between 50 and 70, a low level restricted access to an application in the set 302 may be authorized. In one embodiment, the restricted access may include no access to the application. In some embodiments, the access control policy may require conventional authentication of a user (e.g., using a password or another identifier) if the contextual value is below a certain threshold range as specified in the access control policy. Note that the table 300 illustrates one possible implementation of an access control policy; however, other implementations of the access control policy are possible that may authorized different levels of access to an application.

In some embodiments of the invention, the access control policy may specify different threshold ranges for different types of contextual information. For example, there may be a threshold range of 90-100 for a user's location, a threshold range of 80-100 for the user's picture, a threshold range of 85-100 for the user's touch, and so on.

In some embodiments of the invention, a threshold range may be predetermined for each application. In one embodiment, the threshold range may be pre-determined based on the contextual input under consideration. For example, the threshold range for the set 302 may be determined based on the contextual information from the location sensor unit 106, touch screen unit 108, camera unit 110, microphone unit 112, and the other sensors unit 114. In some embodiments, different weightage may be given to different contextual inputs to determine a threshold range for each application. For example, a contextual input from the location sensor unit 106 and the touch screen unit 108 may have more weightage than the contextual input from the microphone unit 112. In some embodiments, additional credentials may be required from the user for accessing secure applications or data on the mobile device, even if the current context has been correctly determined.

Referring back to FIG. 2, the access level determination module 216 may be configured to determine a level of access to an application. In one embodiment, the level of access may be determined based on the contextual information received by the contextual information receiver module 212 and the access control policy associated with the application, as specified in the access control policies 214. In some embodiments, a level of access may indicate full access, varying degrees of restricted access or no access to the application. In some embodiments, the level of access may be indicated on a scale of 1 to 10, where a first set of actions may be authorized for levels 9-10, a second set of actions may be authorized for levels 6-8, a third set of actions may be authorized for levels 3-5 and a fourth set of actions may be authorized for levels 3 and below, which may include no access. Referring back to FIG. 3, if a user wants to post a comment on a social networking site, if the level of access determined by the access level determination module 216 indicates restricted access (or a level of access equal to 7), only reading of the posts may be allowed and the user may not be authorized to post comments to the social networking site.

The access generator module 218 may be configured to provide access to the application based on the level of access determined by the access level determination module 216. In some embodiments of the invention, different levels of access may be provided to different applications at any given point in time. For example, in a scenario where the user wants to listen to music while posting a comment on a social networking website and the contextual value is determined to be 75, based on the contextual information acquired at that point in time, the user may be authorized full access to the music player, but only partial access to the social networking website. For instance, the user may be able to view posts, but not update or post new comments on the social networking website. Similarly, the user may not be authorized to view the account balance or details, but may be able to make deposits to the account. It will be understood that while the user may be trying to access one or more applications on the mobile device 100 at any given point in time, the contextual information may be automatically getting updated based on any change in the context surrounding the user. In one embodiment of the invention, the change in the context may be automatically detected and the level of access to each application may be automatically changed before or during the access to each application.

In one embodiment, the user may be asked to provide credentials such as a password, a PIN, a response to a challenge question or another personal identification code if the user has not been sufficiently validated to have access to an application based on the contextual information. For example, the contextual information acquired using the sensors may not be satisfactory even after few tries or the profile of the user may require authentication using credentials if the contextual value is below a certain threshold range as specified in the access control policy.

Figure 4:
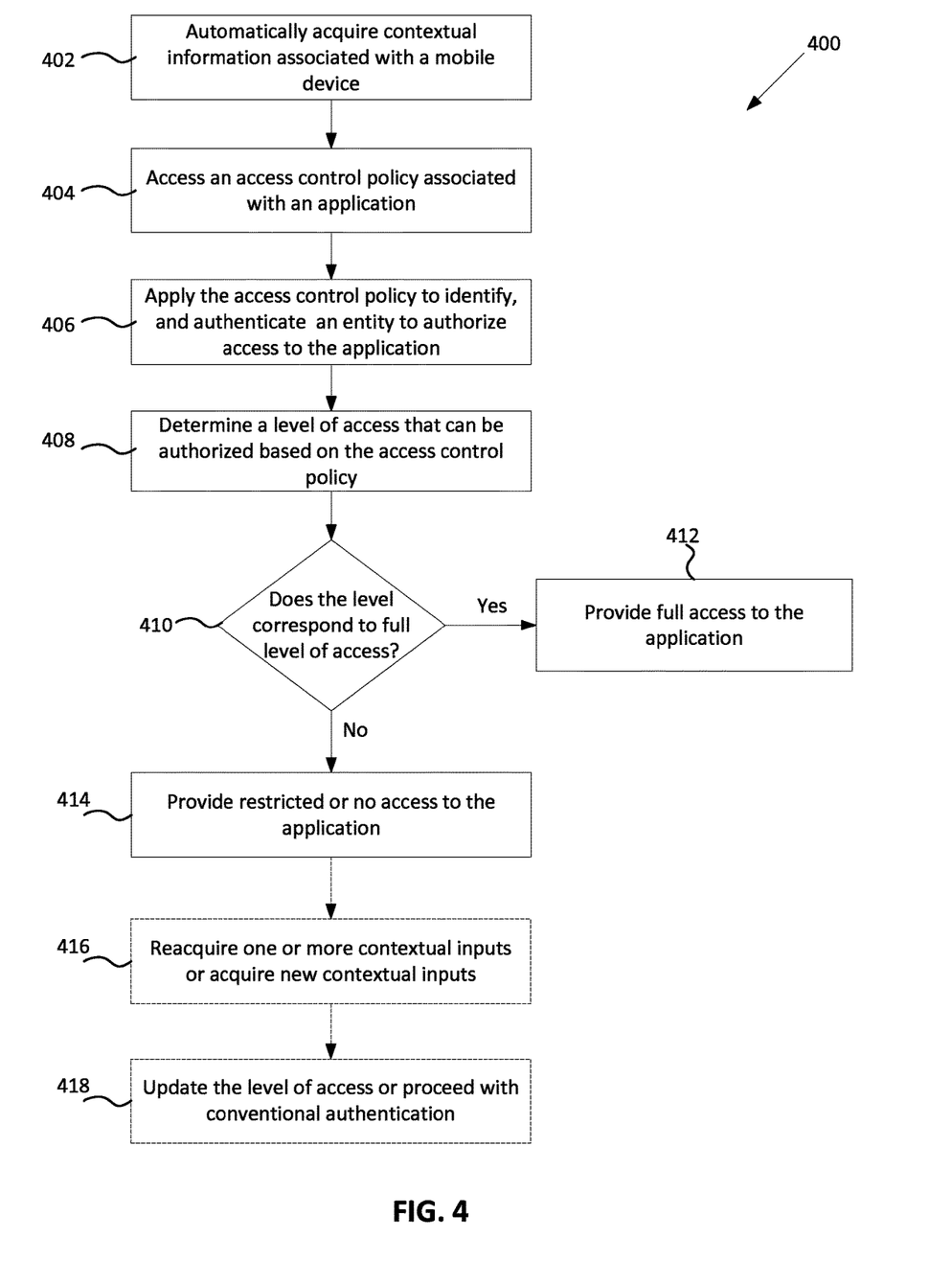
FIG. 4 illustrates a flow diagram for contextualized access control to an application, in one embodiment of the invention.

FIG. 4 illustrates a flow diagram for providing contextualized access control to an application, in one embodiment of the invention.

In step 402, contextual information associated with a mobile device is automatically acquired. Referring back to FIG. 1, contextual information may be automatically acquired using one or more sensors on the mobile device 100. In one embodiment, the contextual information receiver module 212 may receive the contextual information and generate a contextual value. In some embodiments, the contextual information receiver module 212 may consider a behavioral pattern associated with the user along with the contextual information to generate a contextual value. It will be understood that at any given point in time, some of the contextual information acquired from various sensors may not be sufficiently good for inferring a context. For example, a location of the mobile device 100 may be determined with high accuracy but a picture of the user holding the mobile device 100 may not be acceptable (e.g., depending on the angle of the camera facing the user or not enough lighting). In other scenarios, the user's voice may not be available or clear (e.g., in crowded or noisy surroundings). In such scenarios, in some embodiments, the contextual information may be automatically re-acquired if the acquired information is not satisfactory. For example, a picture of the user may be captured again.

In step 404, an access control policy associated with an application is accessed. Referring back to FIG. 3, the access control policies 214 may specify which actions may be authorized for a particular application depending on the contextual information acquired by the mobile device 100. For example, a user may be authorized to only view the balance of a financial account but not make a payment using the account.

In step 406, the access control policy may be applied to identify and authenticate an entity associated with the mobile device. For example, the contextual information received by the contextual information receiver module 212 may be compared with user's profile stored in the profiles 220 to identify the user and authenticate the user.

In step 408, a level of access for the application that can be authorized is determined based on the access control policy. As discussed with reference to FIG. 3, there may be different threshold ranges associated with each application to authorize the user for different levels of access to the application. The access level determination module 216 may determine the level of access based on the access control policies 214 and the contextual value generated by the contextual information acquiring module 212.

In step 410, depending on the level of access determined, a full access, a level of restricted access or no access to the application may be authorized. Different levels of access may be different for different applications.

Figure 5A:
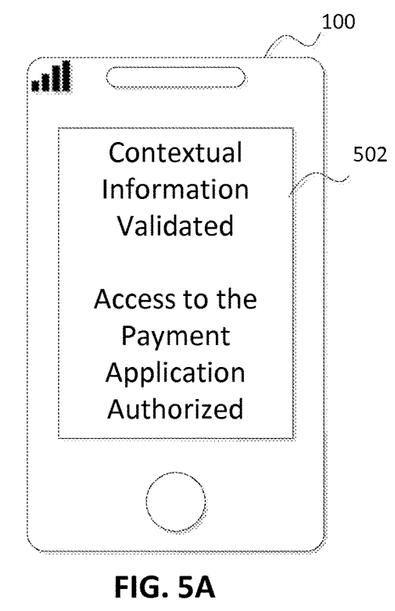
FIGS. 5A-5E illustrate screen shots of a mobile device for contextualized access controls, in one embodiment of the invention.

In step 412, if the level of access corresponds to a full level of access for that particular application, full access to the application may be authorized. For example, the access generator module 218 may receive a level of access authorized for the application from the access level determination module 216 and provide access to the application accordingly. Referring back to FIG. 3, if the user is trying to initiate a payment transaction using a payment application, the user may be authorized to make a purchase using the application if the contextual value is determined to be between 90 and 100. As illustrated in FIG. 5A, in some embodiments, a message 502 may be displayed on the mobile device 100 indicating that the contextual information is validated and the access to the payment application is authorized.

Figure 5B:
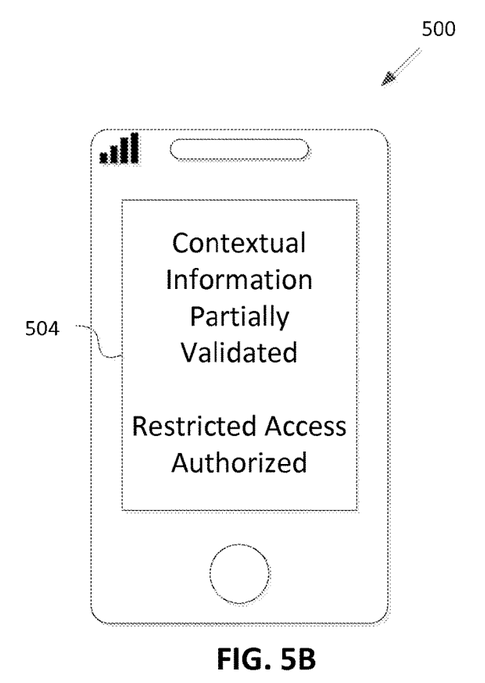
Figure 5C:
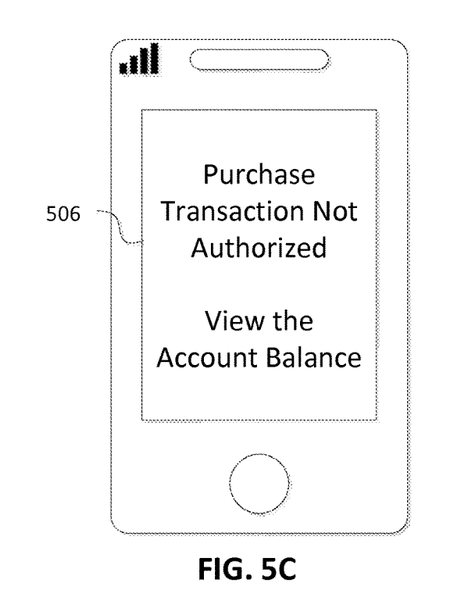

In step 414, if the level of access does not correspond to a full level of access, a level of restricted access to the application may be authorized or in some instances no access to the application may be authorized. In some embodiments, the restricted access may further include multiple restricted levels of access which may be different for different applications. For example, for a payment application, one restricted level may allow viewing of an account balance, another restricted level may only allow deposits, and yet another restricted level may only allow cash withdrawals. For example, as illustrated in FIG. 5B, a message 504 may be displayed on the mobile device 100 indicating that the contextual information is partially validated and only restricted access to the application is allowed. In one embodiment, as shown in FIG. 5C, a message 506 may be displayed on the mobile device 100 indicating that the purchase transaction is not allowed but the user may view the account balance.

Figure 5D:
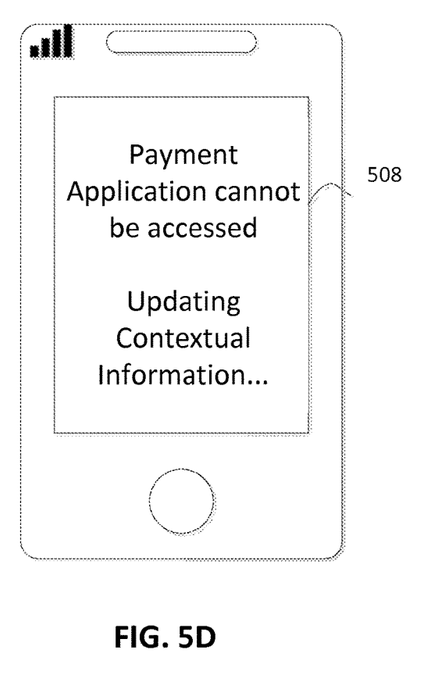

In step 416, if the level of access does not correspond to the full level of access, one or more additional contextual inputs may be acquired or some contextual inputs may be re-acquired as an optional step. For example, if the picture of the user was not very clear, another picture may be captured using the camera unit 110 or the sensors in the touch screen unit 108 may collect additional data from the user's touch 124. If the voice of the user was not taken it to consideration earlier, the voice (if available) may be captured by the microphone unit 112 to determine the level of access. In one embodiment, instead of acquiring additional contextual inputs or re-acquiring some of the contextual inputs, restricted access to the application may be directly allowed. In one embodiment, as illustrated in FIG. 5D, a message 508 may be displayed on the mobile device 100 indicating that the payment application cannot be accessed and the contextual information is updated, e.g., by reacquiring some of the contextual inputs or acquiring new inputs. In other embodiments, the level of access to the application may be automatically updated based on the re-acquired contextual information, without any further notification to the user or action required by the user.

Figure 5E:
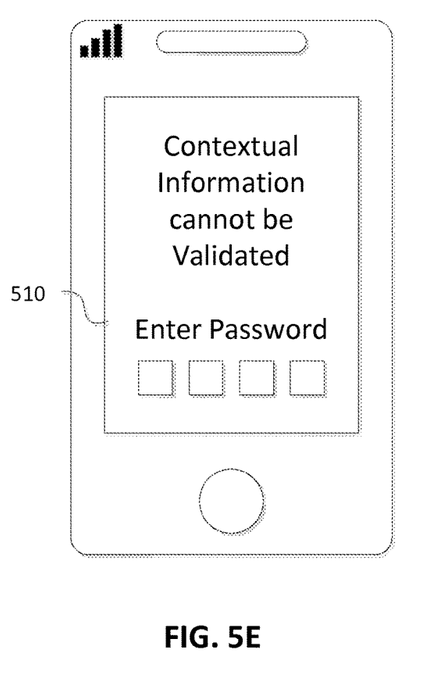

In step 418, the level of access may be updated based on the updated contextual inputs as an optional step. In one embodiment, if access to the application cannot be allowed based on the contextual information, the user may be requested to go through a conventional authentication method, e.g., by providing credentials such as a password or another identifier. For example, as shown in FIG. 5E, a message 510 may be displayed on the mobile device 100 indicating that the contextual information cannot be validated and the user may be asked to enter a password or provide another form of identification.

Figure 6:
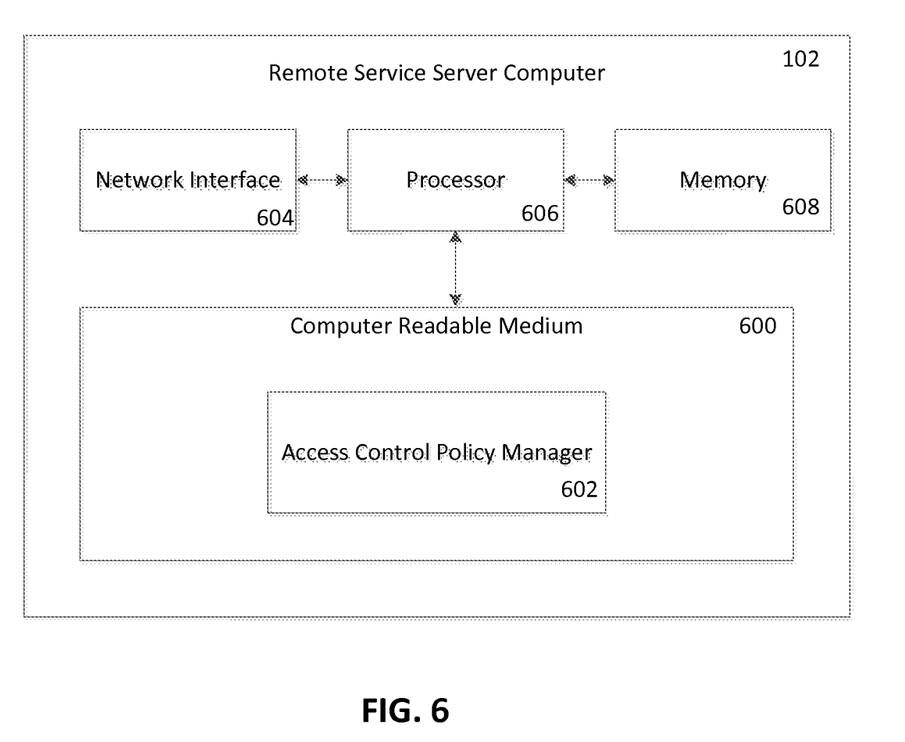
FIG. 6 illustrates at least some components of a remote service server computer, in one embodiment of the invention.

FIG. 6 illustrates at least some components of the remote service server computer 102, in one embodiment of the invention.

The remote service server computer 102 may include a processor 606 which may be communicatively coupled to a network interface 604, a memory 608 and a computer readable medium 600. It will be understood that there may be other components in the remote service server computer 102 which are not shown here for the ease of simplicity. The processor 606 or processing elements may be configured to execute instructions or code in order to implement methods, processes or operations.

The network interface 604 may be configured to communicate with the mobile device 100 and other entities (not shown) using one or more communications networks.

The memory 608 may be coupled to the processor 606 internally or externally (e.g., cloud based data storage) and may comprise any combination of volatile and/or non-volatile memory, for example, RAM, DRAM, ROM, flash, or any other suitable memory device.

The computer readable medium (CRM) 600 may also be in the form of a memory, and may comprise code, executable by the processor 606 for implementing methods described herein. The CRM 600 may include an access control policy manager 602.

The access control policy manager 602 may be configured to manage the access control policies associated with one or more applications for a mobile device. In one embodiment, the access control policy manager 602 may be configured to manage the access control policies 214 for one or more applications associated with the mobile device 100. In one embodiment, a user of the mobile device may need to register with the remote trusted entity in order to allow the remote trusted entity manage the access control policy.

In one embodiment, the remote service server computer 102 may be associated with a remote trusted entity such as a payment processing network and may be configured to determine and manage an access control policy for a payment application on the mobile device 100. For example, a user may conduct a payment transaction using a payment account number that may be stored in a secure memory on the mobile device 100 or in a remote storage associated with the payment processing network. The payment processing network may include data processing subsystems, networks, and operations used to support and deliver authorization services, and clearing and settlement services. An example of payment processing network includes VisaNet®, operated by Visa®. The payment processing network may include wired or wireless network, including the internet.

Embodiments of the invention automatically detect the current context of a user's mobile device to determine a level of access associated with each application on the mobile device. As the context changes due to the change in the environment surrounding the user and the mobile device, the level of access can be modulated to access the application based on the context. The more accurate current context of the user can be determined automatically, lesser interaction with the user may be required to allow access to various applications on the mobile device.

Figure 7:
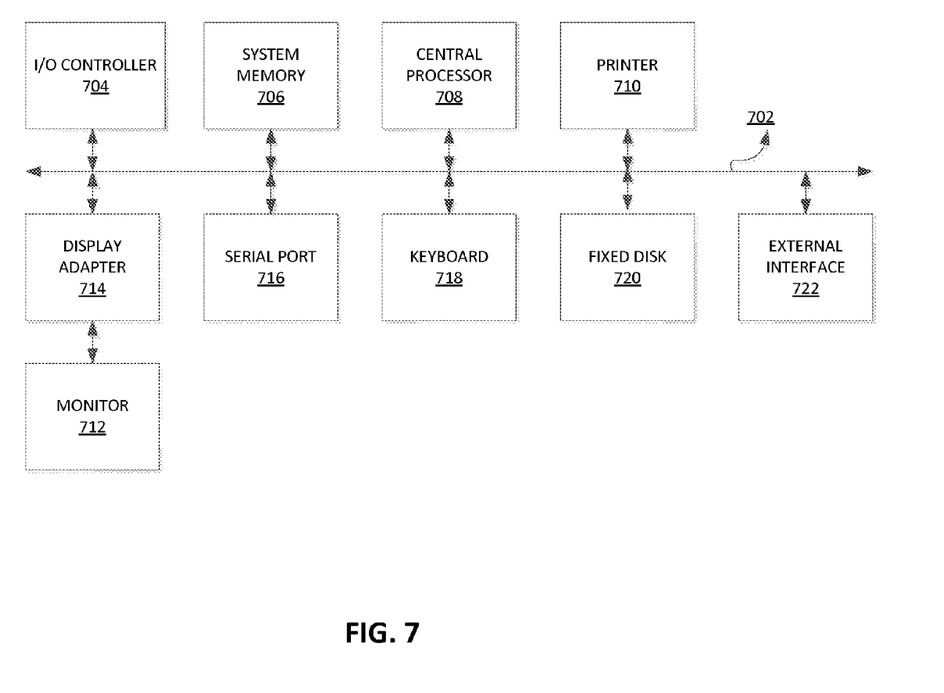
FIG. 7 shows an exemplary computer apparatus in accordance with some embodiments.

FIG. 7 is a high level block diagram of a computer system that may be used to implement any of the entities or components described above. The subsystems shown in FIG. 7 are interconnected via a system bus 702. Additional subsystems include a printer 710, keyboard 718, fixed disk 720, and monitor 712, which is coupled to display adapter 714. Peripherals and input/output (I/O) devices, which couple to I/O controller 704, can be connected to the computer system by any number of means known in the art, such as a serial port. For example, serial port 716 or external interface 722 can be used to connect the computer apparatus to a wide area network such as the Internet, a mouse input device, or a scanner. The interconnection via system bus 702 may allow the central processor 708 to communicate with each subsystem and to control the execution of instructions from system memory 706 or the fixed disk 720, as well as the exchange of information between subsystems. The system memory 706 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A method comprising:
   automatically receiving, at a mobile device via sensors included in the mobile device, contextual information associated with the mobile device, the contextual information related to a physical environment surrounding the mobile device, wherein the contextual information is used in different authentication techniques;
   accessing, at the mobile device, an access control policy associated with an application;
   comparing the contextual information to behavioral patterns associated with a user of the mobile device;
   determining, at the mobile device, a level of access for the application and the user based on the comparison of the contextual information associated with the mobile device to the behavioral patterns and the access control policy associated with the application, wherein the level of access is selected from multiple levels of access available to the user for the application, wherein the different authentication techniques are associated with different levels of access of the multiple levels of access, the multiple levels of access comprising at least full access and partial access;
   receiving an indication that an action has been performed with respect to the mobile device that meets the determined level of access; and
   providing, by the mobile device, access to the application based on the indicated action.

2. The method of claim 1, wherein the application is a financial application.

3. The method of claim 2, wherein the application is used to initiate a financial transaction using a payment account associated with the user of the mobile device.

4. The method of claim 1, wherein the access control policy associated with the application is determined at least partially by a remote trusted entity.

5. The method of claim 1, wherein the access control policy includes a plurality of threshold ranges associated with the different levels of access of the multiple levels of access available to the user for the application.

6. The method of claim 1, wherein the access control policy is associated with a user profile.

7. The method of claim 1, wherein making changes to contents associated with the application requires a higher level of access than reading the contents associated with the application.

8. The method of claim 1, wherein the contextual information comprises at least a location of the mobile device.

9. The method of claim 8, wherein the contextual information further comprises one or more of a picture, voice, fingerprints and gestures associated with the user of the mobile device.

10. The method of claim 1, further comprising:
    receiving, by the mobile device, credentials associated with the user of the mobile device; and
    providing a higher level of access to the application upon validating the credentials.

11. The method of claim 10, wherein the credentials include a personal identification code.

12. A mobile device comprising:
    a processor; and
    a computer readable medium coupled to the processor, the computer readable medium comprising code, executable by the processor to:
       automatically receive contextual information to be used in different authentication techniques associated with the mobile device via sensors included in the mobile device;
       access an access control policy associated with an application;
       determine one or more behavioral patterns associated with a user of the mobile device;
       compare the contextual information to the one or more behavioral patterns associated with the user of the mobile device;
       determine a level of access for the application based on the contextual information associated with the mobile device and the access control policy associated with the application, wherein the level of access is selected from multiple levels of access available to the user of the mobile device for the application, wherein the different authentication techniques are associated with different levels of access of the multiple levels of access, the multiple levels of access comprising at least full access and partial access;
       detect an action that meets the determined level of access; and
       provide access to the application based on the detected action.

13. The mobile device of claim 12, wherein the application is a financial application.

14. The mobile device of claim 13, wherein the application is used to initiate a financial transaction using a payment account associated with the user of the mobile device.

15. The mobile device of claim 12, wherein the access control policy associated with the application is determined at least partially by a remote trusted entity.

16. The mobile device of claim 12, wherein the access control policy includes a plurality of threshold ranges associated with the different levels of access of the multiple levels of access available to the user for the application.

17. The mobile device of claim 12, wherein the access control policy is associated with a user profile.

18. The mobile device of claim 12, wherein making changes to contents associated with the application requires a higher level of access than reading the contents associated with the application.

19. The method of claim 12, wherein the contextual information comprises one or more of a location, picture, voice, fingerprints and gestures associated with the user of the mobile device.

20. The mobile device of claim 12, wherein the processor is further configured to:
receive credentials associated with the user of the mobile device; and provide a higher level of access to the application upon validating the credentials.

* * * * *